May 30, 1944.  R. W. HOFHEINS ET AL  2,350,037
AMPHIBIAN VEHICLE
Filed Dec. 3, 1941  5 Sheets-Sheet 1
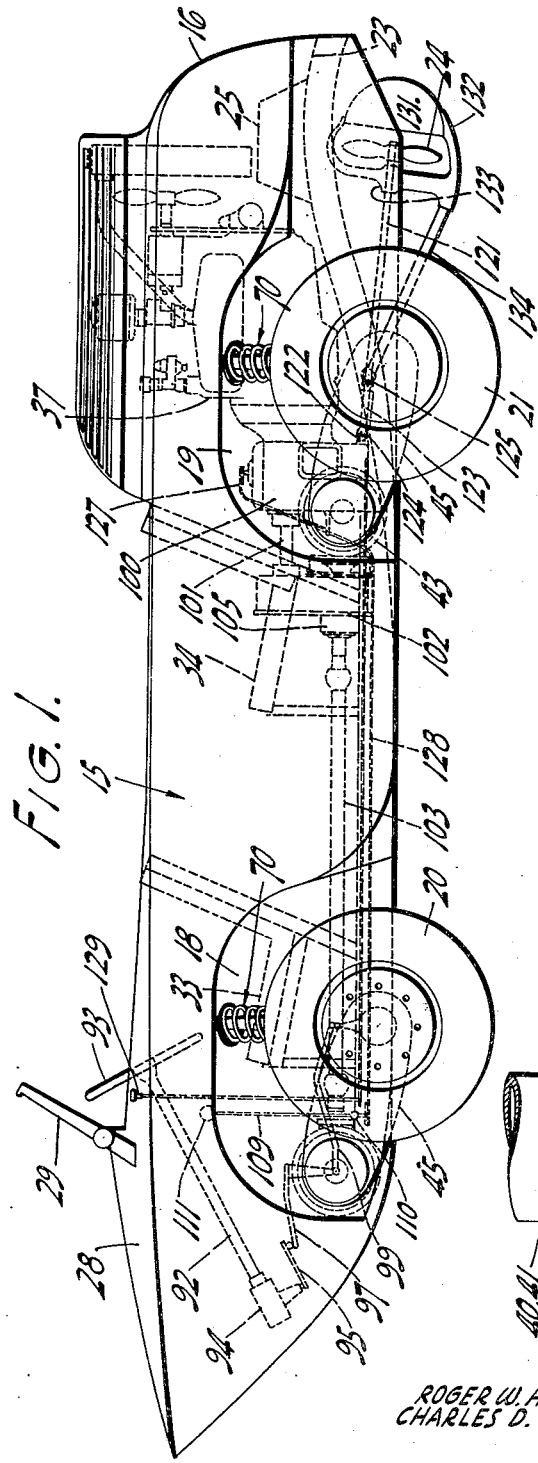
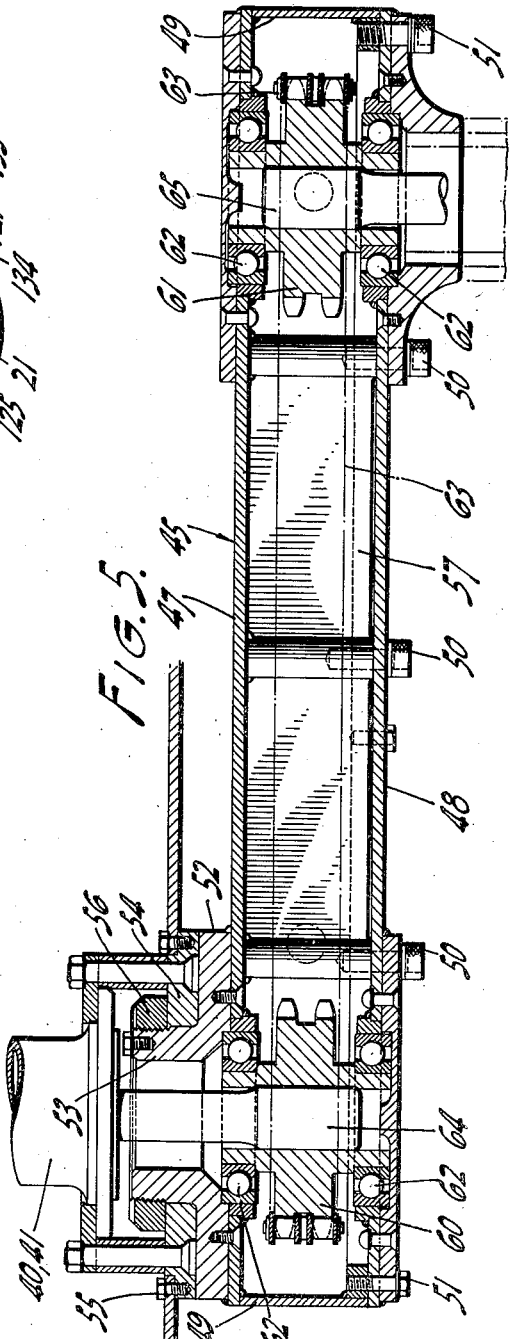
INVENTORS
ROGER W. HOFHEINS, CARLOS E. HARRINGTON
CHARLES D. THOMAS & PAUL P. M. DUBOSCLARD
BY
Bean, Brooks, Buckley & Bean
ATTORNEYS

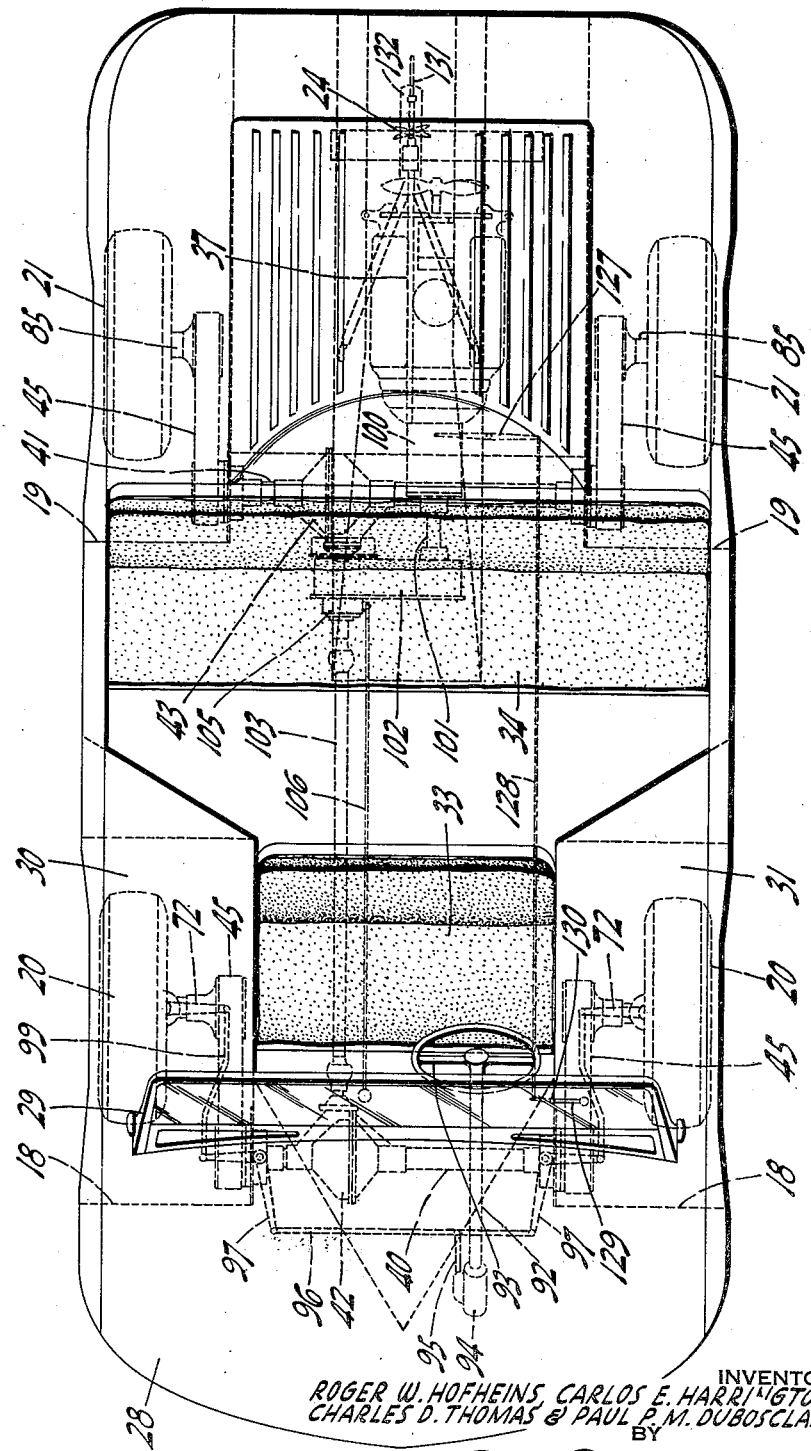

May 30, 1944.   R. W. HOFHEINS ET AL   2,350,037
AMPHIBIAN VEHICLE
Filed Dec. 3, 1941    5 Sheets-Sheet 3

INVENTORS
ROGER W. HOFHEINS, CARLOS E. HARRINGTON
CHARLES D. THOMAS & PAUL P.M. DUBOSCLARD
BY
Bean, Brooks, Buckley & Bean.
ATTORNEYS May 30, 1944.  R. W. HOFHEINS ET AL  2,350,037
AMPHIBIAN VEHICLE
Filed Dec. 3, 1941  5 Sheets-Sheet 5

INVENTORS
ROGER W. HOFHEINS, CARLOS E. HARRINGTON
CHARLES D. THOMAS & PAUL P. M. DUBOSCLARD
BY
Bean, Brooks, Buckley & Bean.
ATTORNEYS Patented May 30, 1944

2,350,037

UNITED STATES PATENT OFFICE 2,350,037

AMPHIBIAN VEHICLE

Roger W. Hofheins, Carlos E. Harrington, Charles D. Thomas, and Paul P. M. Dubosclard, Buffalo, N. Y., assignors to Amphibian Car Corporation, Buffalo, N. Y.

Application December 3, 1941, Serial No. 421,470

21 Claims. (Cl. 115—1)

This invention relates to amphibian vehicles and has particular reference to vehicles arranged for automotive operation upon land or water.

Vehicles aimed at the general ends in view in the present instance have previously been proposed but such vehicles have, in general, reached only the proposal stage and have been impracticable for various reasons. The vehicle of the present invention, on the other hand, is one of demonstrated practicality and, in actual use, performs efficiently either as a ground or marine automotive vehicle.

The machine of the present invention is selectively of two-wheel or four-wheel drive design and is capable of land speeds comparable to those of present day automotive passenger vehicles. As occasion requires it may, by simple manipulation from the operator's compartment, be converted for four-wheel driving over rough terrain, or for marine propulsion. The adjustment necessary for change from land to water operation or vice versa, or for change from four-wheel "tractor" drive to ordinary two-wheel drive on roads or smooth ground, or the reverse, may be effected without stopping the vehicle and by extremely simple manipulation of the operating controls by the driver or operator of the vehicle. The machine also has provision for independently locking one or more of the wheels, and such means, in combination with the four-wheel drive, enables the vehicle to be moved from water to land or vice versa without becoming stuck.

The preferred design of the body or hull of the vehicle of the present invention is such that its marine efficiency is not reduced by the presence of the necessary traction wheels for land operation and, from the standpoint of land operation, the arrangement is such that there is an absolute minimum of unsprung weight.

In the first-described exemplary embodiment of the present invention the traction wheels of the vehicle occupy a normal operating position whether the machine is being used as a land traction vehicle or a marine surface craft. It is, however, within the purview of the invention to provide means, either motive or manual, for retracting the wheels a greater or less degree for marine operation. Modified forms of the first-described embodiment show means for accomplishing this end and it will be noted that the arrangement is such that the traction wheels may be withdrawn at the pleasure and will of the operator after the vehicle has been launched for marine operation. The wheel position controlling means of the modified forms may also be employed for increasing or lessening the ground clearance of the vehicle for varying conditions of land operation.

By virtue of the construction of the instant machine a minimum of sealed joints is required for rendering the several exposed propelling instrumentalities both operable and controllable. In the present machine, to promote marine efficiency as well as to further other objects of the invention, front and rear pairs of ground wheels are provided with differential driving axles which are located substantially entirely within the hull of the vehicle and preferably in fixed positions with respect to the hull. To permit relative movement between the wheels, on the one hand, and the hull and the differential driving axles, on the other, both for springing of the vehicle and for retraction of the ground wheels, the latter are disposed for rotation on axes spaced from their associated driving axles. The mode of transmission of power to the ground wheels is believed to be novel in the construction of amphibian vehicles and offers distinct advantages in constructing craft of this kind.

A novel arrangement is provided for rendering certain of the wheels of the instant vehicle both steerable and tractive without interference with independent spring of such wheels.

In the drawings:

Fig. 1 is a general side elevational view of an exemplary form of the vehicle of the invention;

Fig. 2 is a general top plan view thereof;

Fig. 4 is a fragmentary front elevational view of the right front wheel mounting with parts in cross-section for added clearness;

Fig. 5 is an approximate, horizontal cross-sectional view through the unit employed in transmitting motion from a drive axle to a ground wheel;

Figure 3:
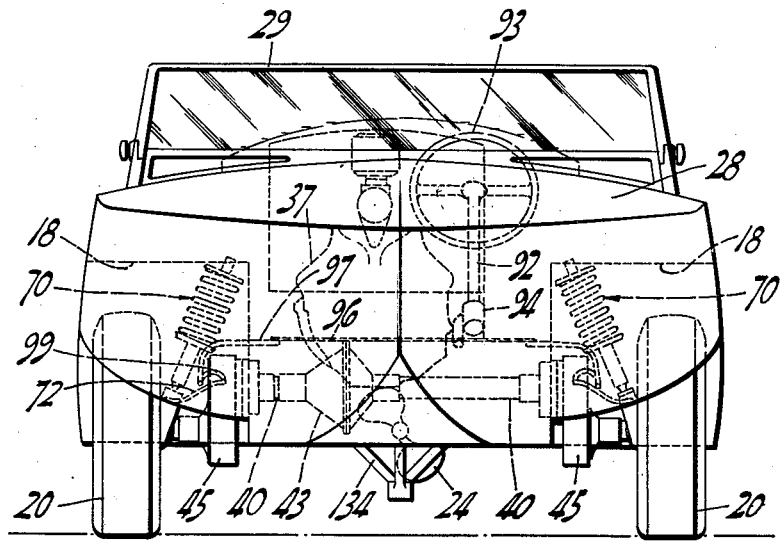
Fig. 3 is a front elevational view of the machine of Figs. 1 and 2.

Throughout the several figures of the drawings like characters of reference denote like parts, and the numeral 15 designates generally a hull or body for the vehicle. The details of the structural framework and particular mode of assembly and reinforcement of the several skin surfaces comprising the hull are immaterial and reference will be had herein only to the contours of the hull insofar as its outline is a material part of the present invention.

The bottom and sides of the hull 15 are unitary and continuously curving save only for the line defining the prow of the hull and the meeting edge of the bottom and the rear wall 16 thereof, and front and rear inward formations 18 and 19 which form recesses adapted to receive, respectively, front and rear traction wheels 20 and 21. One further interruption of the continuously convex curving contour of the exterior of the bottom of the hull 15 is found in a channel 23 formed to receive a marine propeller 24 and its associated driving mechanism, together with a control rudder which will be hereinafter described. An upward extension of the channel 23 is located at 25 and receives the propeller 24 and the rudder when they are retracted in a manner which will presently appear. The hull 15 is provided with a forward deck portion 28 and a windshield 29 may be disposed thereon in any convenient manner. The forward deck portion 28 is preferably extended rearward at its sides to provide deck portions 30 and 31 over the front wheel housing recesses 18.

The space between the rearward deck extensions 30 and 31 provides an ideally located operator's compartment and a seat for the operator is designated 33. The seat 33 provides sufficient space for a passenger for assisting or directing operation or for any other purpose. Directly behind the seat 33 and substantially amidships, a seat 34 is arranged to extend from side to side of the hull 25 and the seat 34 will accommodate a number of passengers limited only by the total width of the machine. It will be noted that the seat 34 is just forwardly of the rear wheel houses 19.

The propelling engine for rendering the vehicle automotive for both marine and land navigation is preferably of the internal combustion type and in the illustrated instance is disposed between the rear wheel houses 19, as at 37. According to the arrangement of the exemplary embodiment, the engine 37 may be disposed directly between the rear wheels 21 without complicating the problem of transmitting power to such rear wheels. The power transmission means will now be described.

Differential axles 40 and 41 are provided for the pairs of front and rear wheels 20 and 21, respectively, and such axles may comprise conventional bevel gear differential drive means, and in the illustrated instance differential gear casings 42 and 43, respectively, are shown offset from the mid-points of the axles 40 and 41 to permit corresponding offsetting of the drive shafts for more convenient arrangement of the instrumentalities for transmission of power from the engine 37 to the drive shafts. The drive system is such that the housings of the differential axles 40 and 41 may be secured directly to the framework of the hull 15 in the interior thereof, with the opposite ends of each differential axle projecting into the opposite front or rear wheel house 18 or 19, as the case may be.

Means for supporting each of the traction wheels 20 and 21 for independent springing as well as for transmitting driving power thereto are illustrated in detail in Fig. 5 which is a longitudinal cross-sectional plan view of any of four wheel support casings designated generally 45 in the several general views.

Each of the wheel support casings 45 comprises inner and outer side wall portions 47 and 48 and a continuous connecting wall portion 49. In the illustrated instance the connecting wall 49 is rigidly secured to the inner wall 47 by welding or the like and the outer wall 48 is removably secured to the connecting wall 49 as by screws 51. A central bracing web 57 may extend between the side wall portions 47 and 48, this web being welded to wall portion 47 and being connected to wall portion 48 by screws 50. One of the elongate casings thus formed is secured against a wall of each of the wheel houses 18 and 19 for pivotal movement, the opposite or outer end of each casing being arranged to support a ground wheel 20 or 21 as the case may be.

For pivotally mounting the casings 45, each is provided with an annular plate 52 having a projecting hub 53 for pivotal engagement in a bearing 54 secured to the inner wall of the wheel house 18, 19 by means of screws 55. The hubs 53 may be retained in bearing engagement by means of a retaining nut 56.

A sprocket 60 is journaled within each casing 45 coaxially with respect to its pivot hub 53 and a second cooperating sprocket 61 is journaled in the opposite outer end of each casing for driving engagement with a ground wheel 20 or 21. As illustrated, anti-friction means may be associated with the journals of the sprockets 60 and 61 and in Fig. 5 such means comprise ball bearings 62. A driving chain which connects the sprockets 60 and 61 for joint rotation is shown at 63 in Fig. 5, portions thereof being schematically indicated by the dot and dash lines connecting the sprockets 60 and 61.

Each differential axle 40 or 41 has oppositely protruding drive shaft portions 64, and in Fig. 5 such protruding portion is shown in driving engagement with sprocket 60. The cooperating sprocket 61 rotates a stub shaft 65 which in the case of rear wheels 21 is connected directly thereto and in the case of front wheels 20 has driving connection therewith through a universal driving connection designated 66 in Fig. 4. Obviously, if desired, the rear wheels may be rendered steerable in the same manner as the front wheels.

Each of the wheels 20 and 21 is mounted for independent resilient movement about the pivotal connection of its associated wheel support casing 45 and to this end a spring strut designated generally 70 is preferably provided for each wheel to extend between the wheel proper and a stationary part of the vehicle. Fig. 4 shows one such spring strut in detail in association with a steerable front wheel 20. Such front wheel is provided with a steering knuckle 71 of the kind conventionally employed in steering mechanism operating according to the Ackerman principle. A steering arm 72 connects with the kingpin of the steering knuckle 71 and the linkage for controlling the disposition of the steering arm is shown in Figs. 1, 2 and 3 and will be hereinafter described.

The spring strut of Fig. 4 terminates at its opposite ends in stub shafts 74 and 75, the former of which is secured in the hull 15, preferably in that portion comprising the upper wall of the wheel house. The other of the stub shafts, 75, is preferably formed at its end with a ball 76 for seating in a socket formed in the steering knuckle 71 and a suitable cap 77. In the case of a rear non-steerable wheel, the ball 76 will obviously seat in a similar socket formed on the housing connecting the wheel bearing and the casing 45, as at 85 in Fig. 2.

The upper stub shaft 74 seats in a resilient cup 78 of rubber or the like which in turn is disposed in a seat formed in an enlargement 79 provided at one end of a shaft 80. The shaft 80 telescopes into a sleeve 81 which extends upwardly from and is fixed to the lower stub shaft 75, the shaft 80 and the sleeve 81 being free for relative axial sliding movement. Spring seats 82 and 83 are fixed, respectively, to the enlargement 79 of the shaft 80 and the sleeve 81, and a compression coil spring for resiliently resisting relative upward movement of an associated traction wheel is disposed between such seats as at 84.

For limiting and resiliently cushioning maximum upward relative movement of a wheel through pivotal movement of a drive casing 45, each spring strut is preferably provided with a block of resilient material, 86, which is secured against the spring seat 83 for abutment with a flange 87 which is fixed axially with respect to the shaft 80 as by means of a supporting tube 88 extending rigidly between the flange 87 and the enlargement 79 of the shaft 80.

The resilient cup 78 cooperates with the ball and socket attachment of the lower end of the spring strut 70 to permit limited variation in the angular disposition of the spring strut 70 necessitated by upward and downward relative movement of the associated traction wheel.

Referring to Figs. 1, 2 and 3, a conventional steering column 92 and steering wheel 93 are disposed in the operator's compartment for guiding the steerable front wheels 20. Any of the conventional reducing gears may be employed as indicated at 94 for transmitting rotative movements of the steering wheel to a steering pitman 95 which at its outer end pivotally engages a cross tie rod 96. A pair of bell cranks 97 are arranged as best shown in Figs. 2 and 3 with their main bearings arranged inside the hull 15 but closely adjacent the wall portions which define the inner vertical faces of the front wheel houses 18 and for pivotal movement about substantially vertical axes. In the preferred embodiment each of the bell cranks has forwardly extending arms which pivotally engage opposite ends of the cross tie rod 96 and outwardly extending arms which pivotally engage the forward ends of a pair of fore and aft drag links 99 whose rear ends pivotally engage the steering knuckle arm 72. The pivotal connections between the drag links 99 and the bell cranks 97 are preferably arranged with sufficient clearance to permit limited pivotal movement of the drag links 99 about such connections in vertical, longitudinal planes, whereby the drag links may pivot with the resilient pivoting of the casings 45.

If desired corresponding steering linkage may be provided for the rear wheels, either for joint steering operation with the front wheels under the control of a common steering wheel or entirely independently thereof.

By virtue of the present design the projection of drive and control means through the hull is arranged, in the several instances, to involve a minimum of body movement of the projecting part at the point where it passes through the hull. In the case of the bell cranks 97 this end is attained by the disposing of the axes thereof inside of but very closely adjacent the wall of the hull 15. In the proposed construction flexible annular sleeves or membranes are each secured at one peripheral edge to the wall of the hull 15 and at the other peripheral edge to the projecting control part, in the present instance the arm of a bell crank 97. These sealing devices may be of rubber or neoprene but are preferably of fabric suitably impregnated to be rendered watertight.

The running gear of the primary embodiment having thus been described, attention will now be directed to a complete description of the drive system for both land and marine propulsion. The crankshaft of the propelling engine 37 extends forwardly to a conventional change-speed transmission unit 100 and the output shaft 101 thereof continues forwardly and terminates in a chain drive transmission casing 102. A pair of cooperating sprockets (not shown) in the casing 102 transmit the rotative drive of the output shaft 101 to a drive shaft 103 which extends to driving engagement with the front differential driving axle 40 and a second drive shaft extends coaxially but rearwardly of the drive shaft 103 to driving engagement with the rear differential axle 41. Such second drive shaft does not appear in the drawings since the chain drive casing 102 and the differential gear casing 43 of the rear axle 41 are substantially in abutment.

A clutch 105 is interposed between the transmission 100 and the front driving shaft 103 whereby the vehicle may readily and selectively be converted for either conventional rear wheel drive or four wheel drive, the latter mode being generally availed of when traversing rough terrain. A manual control link for engaging and disengaging the clutch 105 is indicated at 106.

Figure 7:
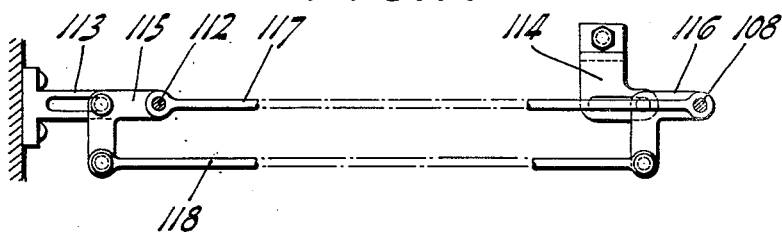
Fig. 7 is a fragmentary plan view showing the transmission control linkage in detail.

Control of the change-speed transmission 100 is effected remotely from the operator's position and an example of suitable linkage for effecting such control is shown in detail in Fig. 7. As there shown the conventional shifting fork of an otherwise conventional automotive transmission assembly is disposed as at 108. A shifting lever 109, see Fig. 1, has a ball mounting 110 whereby its control handle 111 may be moved universally in a horizontal plane. The projection of the lever 109 below its ball mounting 110 appears at 112 in Fig. 7 and movements thereof fore and aft and laterally, by manipulation of the control handle 111, are duplicated exactly by the shifting fork 108 in the following manner.

Longitudinally slotted brackets 113 and 114 are secured to the vehicle framework adjacent the shifting lever 109 and the shifting fork 108 of the transmission 100, respectively. Each of the brackets 113 and 114 supports, for free pivotal and longitudinal movement, a bell crank 115 and 116 respectively. The corresponding outer ends of the bell cranks 115 and 116 are pivotally connected to the opposite ends of a pair of rigid links 117 and 118 and a corresponding end of each bell crank 115, 116 engages, respectively, the lower projection 112 of the shifting lever 109 and the shifting fork 108. Obviously, longitudinal movement of the projection 112 will move the bell crank 115 longitudinally in its slot in the bracket 113 and, through the link 117, cause like longitudinal movement of the bell crank 116 in its slot in the bracket 114. Lateral movement of the projection 112 will cause duplicate pivotal movement of the bell cranks 115 and 116 through the connecting link 118.

The marine propulsion mechanism comprises the previously alluded to propeller 24 and a drive shaft 121 therefor. The drive shaft 121 has operative connection with a take-off shaft 122 projecting from the transmission unit 108 through a connecting shaft 123 which is connected at its opposite ends to the take-off shaft 122 and the propeller drive shaft 121 by means of universal joints 124 and 125, respectively. By means of this flexible drive connection the propeller may assume its illustrated operative position or may be retracted during periods of disuse. The sealing treatment of the connecting shaft 123 where it extends through the hull 15 is the same as in the case of the projecting arms of the bell cranks 97 of the steering mechanism and is not illustrated in the drawings.

The details of the drive to the take-off shaft 122 are not shown. Suffice it to say that commercial units are available for association with conventional transmission units, such commercial units comprising a gear for constant engagement with a continuously rotating shaft of the transmission unit and a clutch for controlling driving engagement between the gear and the take-off shaft 122. A clutch controlling lever is shown at 127 in Fig. 2 and is rendered manually operable by the operator of the vehicle through a link 128 which connects pivotally therewith and with a manual control lever 129 which is pivotally supported adjacent the operator's compartment as at 130.

A suitable rudder 131 for marine steering may be supported for pivotal movement about a substantially vertical axis by means of a bracket 132 which includes bearing means 133 for supporting the propeller end of the drive shaft 121. The bracket 133 is provided with tie rods 134 connecting pivotally with the hull 15 as at 135 at points coaxial transversely with the axis of the universal joint 125, whereby the propeller shaft 121, the tie rods 134, the bracket 132 and the propeller 24 may pivot about the axis of the universal joint 125 in a vertical direction.

Figure 8:
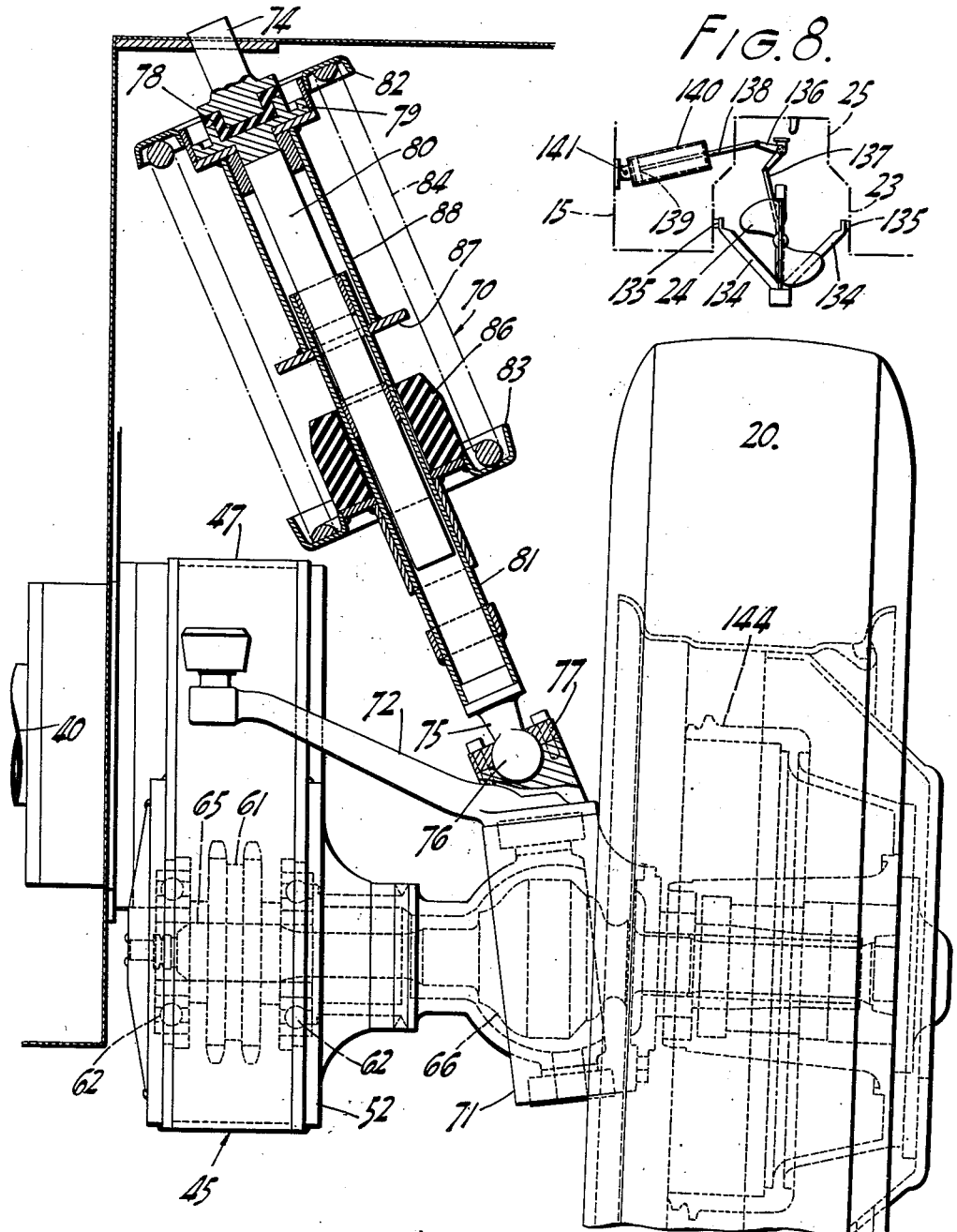
Fig. 8 is a fragmentary rear elevational view showing linkage for raising and lowering the marine propeller of the machine.

For retraction of the propeller during periods of disuse motor means are provided and such means are shown in fragmentary detail in Fig. 8. In Fig. 8 the outline of the hull 15 is fragmentarily indicated in dot and dash lines and the propeller channel 23 and the upward extension 25 thereof which are formed in the hull 15 are similarly indicated.

A bell crank 136 is pivotally supported in the channel extension 25 and a link 137 pivotally engages between the outer end of one of its arms and the propeller drive shaft 121 or some other convenient point of attachment on the assembly comprising the bracket 132. The other arm of the bell crank 136 engages a piston rod 138 of a piston 139 in a motor cylinder 140. The cylinder 140 is pivotally attached to the hull 15 of the vehicle as at 141 and conventional hydraulic or pneumatic conduits, not necessary to be illustrated, are provided for controlling movement of the piston 139 in the cylinder 140 and thereby effecting raising and lowering movement of the propeller 24.

The propeller 24 is shown in its lowered, operative position in Fig. 8. Projection of the piston rod 138 to the right as there viewed, by proper application of fluid pressure in the cylinder 140, rotates the bell crank 136 in a clockwise direction and raises the propeller 24. The several parts are so proportioned that limit movement of the piston 139 and the piston rod 138 rotates the bell crank 136 until its first mentioned arm, the one connecting with the link 137, passes a vertical position. As a result of this arrangement, which is in effect an overcenter action, the weight of the propeller 24 and its associated parts tend to produce continued clockwise rotation of the bell crank 136 and the propeller 24 is accordingly prevented from retrograde lowering movement after the fluid energy is dissipated in the motor with the propeller in an idle raised position. Lowering of the propeller may be effected only by resumption of operation of the motor to move the piston 139 to the left as viewed in Fig. 8 and the benefits of this arrangement as a safety feature in insuring against unintended lowering of the propeller assembly are obvious.

Figure 6:
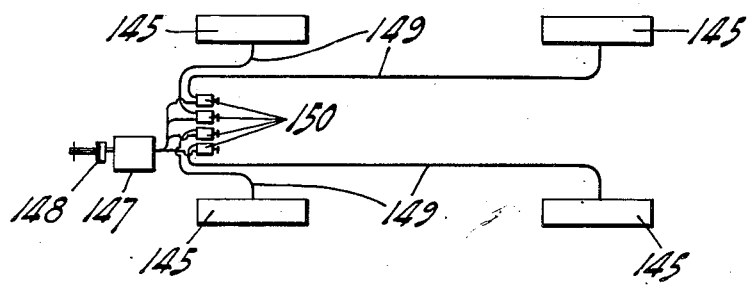
Fig. 6 is a diagrammatic view of the hydraulic circuits for the braking mechanism.

The vehicle of the present invention is provided with a wheel braking system and in the presently preferred embodiment such system is of the hydraulic type. Each wheel is provided with a brake drum as at 144 in Fig. 4 which is provided in turn with internal expanding brake shoe means of conventional form and not shown. The braking system is indicated schematically in Fig. 6 and comprises a hydraulic brake for each of the four wheels. The several individual wheel braking assemblies are indicated at 145 in Fig. 6.

A master cylinder or fluid reservoir is indicated at 147 and a manual brake pedal for generating fluid pressure in the system by way of the master cylinder 147 is designated 148. A conduit 149 leads to each of the brake assemblies 145 and each such conduit has interposed therein a manually operable conduit closing valve 150 which may be of any desired construction. The several manual conduit closing valves 150 are preferably arranged on the vehicle instrument panel or in any other position where they will be conveniently accessible to the operator of the vehicle for manipulation.

It will be seen from the foregoing that any one or more of the four brake assemblies 145 may be temporarily locked in braking position by depressing the brake pedal 148 and, with such pedal depressed and a column of fluid in each conduit 149, closing the desired one or combination of the valves 150, whereby when pressure is removed from the brake pedal 148 a brake actuating column of liquid is enclosed in such conduits 149 as have their manual valves 150 in conduit closing position. Subsequent release of such selectively locked brakes may be effected when desired by merely opening the closed valves 150.

From the foregoing, and bearing in mind the presence of the two differential driving axles and the releasable clutch 105 interposed in the front wheel driving shaft 103, it will be seen that virtually any combination of wheels may be temporarily rendered driving traction wheels to the exclusion of the remainder by merely locking the brake mechanisms of those not desired to be used. This flexibility in the choice of driving wheels is of general utility in traversing rough terrain but is of particular importance in passing from marine to land travel since in this maneuver it frequently occurs that one of the front wheels, for instance, reaches driving contact with the shore before the other. Without the arrangement of the present invention such wheel could not be employed as a driving traction wheel because of the presence of the differential axle 40.

Figure 11:
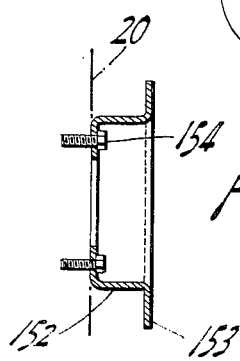
Fig. 11 is a detailed cross-sectional view of a winch pulley preferably provided for use with the driving wheels.

A new cooperation of the selective wheel locking arrangement is found in the provision of winch means adapted to be readily associated with any desired wheel of the vehicle for rotation thereby. The winch is preferably one which may quickly be associated with or detached from its operative position and in the embodiment illustrated in Fig. 11 comprises merely a pulley 152, preferably shrouded at its outer side as at 153, and fastenable coaxially with any of the wheels 20, 21 as by means of screws 154. With the pulley secured to any desired wheel 20, 21 a cable or line may be fixed thereto and wound thereon by driving rotation of the ground wheel, the other end of the cable being secured to a tree or other point of anchorage, and in this manner the vehicle is arranged to draw itself out of a mired position or any other situation in which its other drive means are ineffective.

Figure 9:
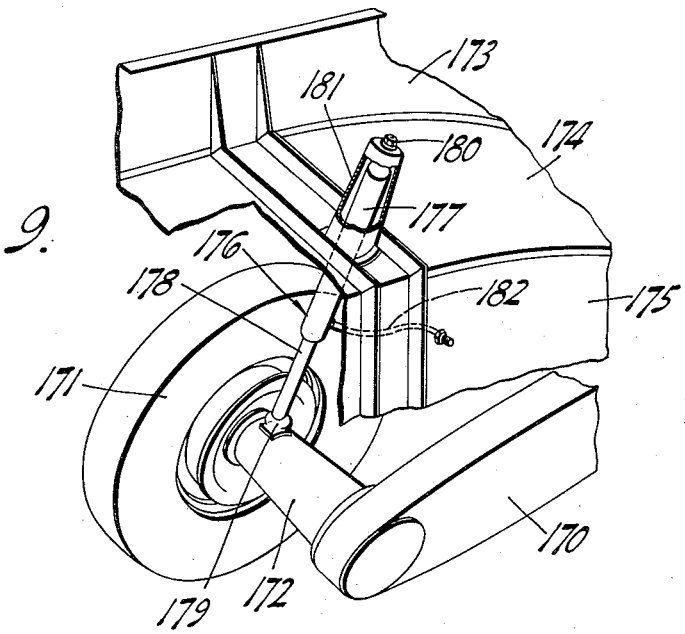
Fig. 9 is a fragmentary perspective view of a modified wheel mount provided with hydraulic retracting means.
Figure 10:
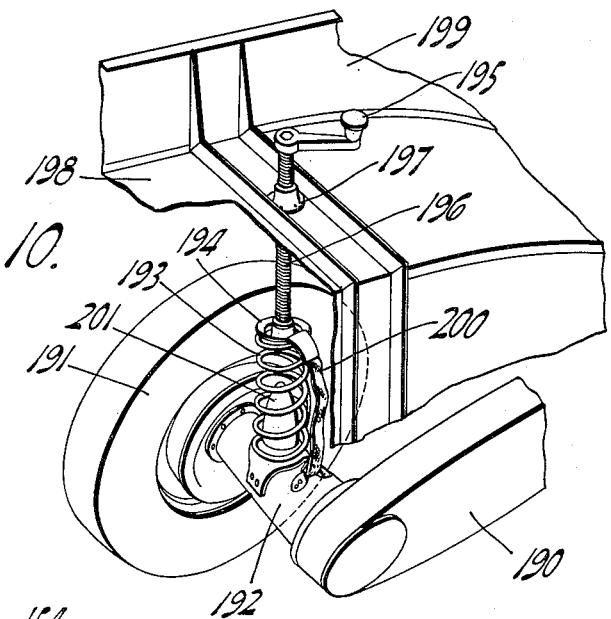
Fig. 10 is a similar perspective view of another modified wheel mount employing manual retracting and projecting means.

It is desirable under certain circumstances to arrange the traction wheels of the amphibian vehicle in such manner that they may be selectively retracted to a wholly housed position or projected outwardly for tractive engagement with the ground. Figs. 9 and 10 of the drawings illustrate effective means for accomplishing such retraction and projection. According to Fig. 9 the chain drive casing 170 is the same as that designated 45 in the primary embodiment and a similar traction wheel is designated 171. A housing 172 extending between the casing 170 and the wheel 171 is such as would normally be employed in a non-steerable wheel but the retracting and projecting means of Fig. 9 is intended to be applied likewise to steerable wheels as in the case of the spring strut 70 of the primary embodiment.

In Fig. 9 the numeral 173 designates the hull of the vehicle and a wheel compartment for the wheels 171 is formed by an inward extension 174 of such hull, terminating in an inward vertical wall portion 175. What is known in the art as an oleo strut is designated generally 176 and comprises merely a hydraulic cylinder 177 having an axially movable piston (not shown) and a piston rod 178 movable axially thereby. An end of the piston rod 178 is secured to the housing 172, preferably universally, as at 179, and the remote end of the cylinder 177 is likewise swivelly mounted to the hull of the vehicle as at 180. In the instant embodiment the wall portion 174 of the hull is shown as provided with a cup formation 181 which is provided merely to accommodate a longer oleo strut or hydraulic motor. A conduit is indicated at 182, and control of the position of the piston rod 178 with respect to the cylinder 177 by movement of the hydraulic medium into and out of the cylinder 177 is effected in a manner well known in the art and preferably from the operator's compartment.

In the construction of Fig. 9, supplementary yielding movement of the wheels 171 may be accomplished by incorporating spring means between the piston rod 178 and the housing 172, or between the end of the cylinder 177 and the cup 181 of the vehicle hull, or in any other convenient manner as by rendering the normally hydraulic system partly pneumatic.

So-called oleo struts are commercially available wherein spring means are incorporated within the cylinders thereof. In such devices the axial position of the piston rod with respect to the piston is determined in the first instance by control of the flow of the hydraulic medium to and from the strut, but such primary adjustment is subject to resilient cushioning movement between the piston rod and cylinder thereof. Such a strut may be used in constructing the embodiment of Fig. 9 and since those devices are known to those skilled in the art to which the present invention pertains, detailed delineation is unnecessary.

In the case of a steerable wheel the connection of the piston rod 178 at 179 will obviously be disposed substantially atop the kingpin or steering knuckle as in the case of the spring strut of the primary embodiment.

In Fig. 10 the gear casing 190 corresponds to the gear casings 45 and 170 of the previous embodiments and the wheel 191 corresponds to the traction wheel of Fig. 9. Similarly the housing 192 connecting the gear casing 190 and the wheel 191 corresponds to the housing 172 of Fig. 9. In Fig. 10 a coil spring element 193 is secured at its lower end to the housing portion 192 and has at its upper end a spring seat or perch 194 which is vertically adjustable by manipulation of a handle 195 accessible from within the vehicle and fixed to a screw 196, the latter being threaded through a bushing 197 secured in a horizontal wall portion 198 which forms a part of the wheel compartment formed in the hull 199 of the vehicle in this embodiment.

A flexible but substantially non-resilient strap 200 connects between the housing portion 192 in the upper spring perch 194 whereby when the screw 196 is manipulated to raise the wheel 191 from ground engaging position, it is not required to remove all of the initial tension from the spring 193 to effect lifting of the wheel. An upward projection 201 is shown secured to the housing 192 in Fig. 10 and such projection serves to guide and centralize the coil spring 193.

While preferred details of construction have been set forth in detail herein, it is to be understood that the present invention is not to be considered as limited thereto or otherwise than as defined in the appended claims. Thus, the wheels for land travel are shown as disposed in recesses in the hull, since this arrangement will secure the most efficient operation. Omission of the recesses will result in a simpler although less efficient construction. Again, the traction wheels are shown as disposed rearwardly of their associated differential axles. For certain purposes, it may be desired that the front traction wheels be disposed forwardly of the front differential axle, thus securing a longer effective wheelbase. Likewise, the rear traction wheels could be disposed forwardly of the rear differential axle. Still again, the means for independently locking one or more wheels might be mechanical instead of hydraulic, or the locking means might be applied to the differential rather than directly to the wheels. Still again, the means for retracting the propeller may be operated mechanically instead of hydraulically or pneumatically. Still again, the engine may if desired be located elsewhere than in the rear of the vehicle, although this location seems to be the most practical. Still again, the brake drums for selectively locking any wheel in position may be located not on the wheel itself but on the differential driving axle within the hull of the vehicle. Other modifications equally are possible.

We claim:

1. An amphibian vehicle comprising a watertight hull, a passenger compartment within said hull, a propelling engine within said hull and rearwardly of said passenger compartment, fore and aft differential driving axles each extending transversely of said vehicle and terminating at both ends exteriorly of said hull, driving connections between said propelling engine and each of said differential driving axles, means for connecting and disconnecting said driving connections, a marine propeller in the rear part of said vehicle, means for retracting said propeller, a driving connection between said propelling engine and said propeller, means for connecting and disconnecting said last-named driving connection, elongate transmissions each attached at one end to an end of one of said differential driving axles and extending longitudinally of said vehicle, a casing for each of said transmissions, each said transmission and casing being mounted for pivotal movement about its associated differential driving axle, land traction wheels supported at the opposite ends of each of said transmissions, and means for selectively and independently locking each of said traction wheels against rotative movement.

2. An amphibian vehicle comprising a watertight hull, a passenger compartment within said hull, a propelling engine within said hull and rearwardly of said passenger compartment, inwardly directed recesses at each side of the exterior of said hull fore and aft, fore and aft differential axles each extending transversely of said vehicle and into said recesses, driving connections between said propelling engine and each of said differential driving axles, means for connecting and disconnecting said driving connections, a marine propeller in the rear part of said vehicle, means for retracting said propeller, a driving connection between said propelling engine and said propeller, means for connecting and disconnecting said last named driving connection, elongate transmissions each attached at one end to an end of one of said differential driving axles and extending longitudinally of said vehicle, a casing for each of said transmissions, each said transmission and casing being mounted for pivotal movement about its associated differential driving axle, resilient means for yieldably limiting upward pivotal movement of each said transmission and casing, land traction wheels supported at the opposite ends of each of said transmissions, and means for selectively and independently locking each of said traction wheels against rotative movement.

3. An amphibian vehicle comprising a watertight hull, a propelling engine located within said hull, fore and aft differential driving axles each extending transversely of said vehicle and terminating at both ends exteriorly of said hull, disconnectible driving connections between said propelling engine and each of said differential driving axles, elongate transmissions each attached at one end to an end of one of said differential driving axles and extending longitudinally of said vehicle, a casing for each of said transmissions, each said transmission and casing being mounted for pivotal movement about its associated differential driving axle, land traction wheels supported at the opposite end of each of said transmissions, and yieldable means providing resilient pivotal movement of said casings to cushion road shocks.

4. An amphibian vehicle comprising a watertight hull, a propelling engine located within said hull, fore and aft differential driving axles each extending transversely of said vehicle and terminating at both ends exteriorly of said hull, disconnectible driving connections between said propelling engine and each of said differential driving axles, elongate transmissions each attached at one end to an end of one of said differential driving axles and extending longitudinally of said vehicle, a casing for each of said transmissions, each said transmission and casing being mounted for pivotal movement about its associated differential driving axle, land traction wheels supported at the opposite end of each of said transmissions, and means for selectively and independently locking each of said traction wheels against rotative movement.

5. An amphibian vehicle comprising a watertight hull, a recess at each side thereof fore and aft to provide compartments for receiving land traction wheels, a propelling engine located within said hull, fore and aft differential driving axles each extending transversely of said vehicle and terminating at both ends in said recesses, disconnectible driving connections between said propelling engine and each of said differential driving axles, elongate transmissions each attached at one end to an end of one of said differential driving axles and extending longitudinally of said vehicle, a casing for each of said transmissions, each said transmission and casing being mounted for pivotal movement about its associated differential driving axle, resilient means for yieldably limiting upward pivotal movement of each said transmission and casing, and land traction wheels supported at the opposite ends of each of said transmissions.

6. An amphibian vehicle comprising a watertight hull, a recess at each side thereof fore and aft to provide compartments for receiving land traction wheels, a propelling engine located within said hull, fore and aft differential driving axles each extending transversely of said vehicle and terminating at both ends in the fore parts of said recesses, disconnectible driving connections between said propelling engine and each of said differential driving axles, elongate transmissions each attached at one end to an end of one of said differential driving axles and extending rearwardly of said vehicle, a casing for each of said transmissions, each said transmission and casing being mounted for pivotal movement about its associated differential driving axle, resilient means for yieldably limiting upward pivotal movement of each said transmission and casing, land traction wheels supported at the rearward ends of each of said transmissions, and means for selectively and independently locking each of said traction wheels against rotative movement.

7. An amphibian vehicle comprising a watertight hull, a passenger compartment within said hull, a propelling engine within said hull and rearwardly of said passenger compartment, fore and aft differential driving axles each extending transversely of said vehicle and terminating at both ends exteriorly of said hull, driving connections between said propelling engine and each of said differential driving axles, means for selectively connecting and disconnecting said driving connections for selectively rendering one or both driving axles effective, a marine propeller in the rear part of said vehicle, means for retracting said propeller, a driving connection between said propelling engine and said propeller, and means for connecting and disconnecting said last-named driving connection.

8. In an amphibian vehicle, a watertight hull, fore and aft axles passing through the walls of said hull, an elongate drive transmission attached to each end of said axles and mounted for pivotal movement thereabout, a casing for said transmission, a traction wheel mounted at the other end of each of said transmissions, and a resilient strut engaging between said casing adjacent said other end of each transmission and an upper stationary part of said vehicle and being resiliently compressible for rendering each wheel independently resiliently mounted for limited pivotal movement.

9. In an amphibian vehicle, a watertight hull, spaced fore and aft recesses at opposite sides of said hull to provide compartments for receiving land traction wheels, elongate wheel supports extending substantially longitudinally in said recesses and pivotally attached at their fore ends to the wall of said hull, a traction wheel mounted at the rear end of each of said supports, and means yieldably resisting upward movement of each of said wheels comprising telescoping means swivelly secured at its opposite ends to said wheel support adjacent said wheel and to an upper stationary part of said vehicle, and a compression coil spring for yieldably resisting telescoping movement of said telescoping means.

10. In an amphibian vehicle, a watertight hull, spaced fore and aft recesses at opposite sides of said hull to provide compartments for receiving land traction wheels, an elongate wheel support extending substantially longitudinally in each of said recesses and pivotally attached at one of its ends to the wall of said hull, a traction wheel mounted at the opposite end of each of said supports, and means cooperating with said pivotal attachment for yieldably supporting said traction wheel, said means comprising telescoping elements secured respectively at opposite ends to said wheel support adjacent said wheel and to an upper stationary part of said vehicle, and a compression coil spring for yieldably resisting telescoping movement of said elements.

11. In an amphibian vehicle, a watertight hull, a wheel compartment formed therein at each side thereof, an elongate wheel support extending substantially longitudinally in each of said recesses and pivotally attached at one of its ends to the wall of said hull, a traction wheel mounted at the opposite end of each of said supports, and resilient means engaging at its opposite ends with said support adjacent said wheel and with an upper stationary part of said vehicle for yieldably resisting upward movement of said wheel about the pivotal attachment of said support, manually operable steering gear and a transverse steering tie rod within said hull and actuable thereby, an arm pivoted within said hull adjacent each wheel compartment and extending into the latter at a point adjacent the pivotal attachment of said wheel support, said arm having connection within said hull with said tie rod for oscillation thereby, a steering knuckle arm on each of said wheels, and a fore and aft drag link connecting pivotally between each steering knuckle arm and the outer end of each of said pivoted arms.

12. In an amphibian vehicle, a watertight hull, spaced fore and aft recesses at opposite sides of said hull to provide compartments for receiving land traction wheels, a steerable wheel at each side of said vehicle in a fore recess thereof, manually operable steering gear and a transverse steering tie rod within said hull and actuable thereby, a bell crank pivoted for movement about a substantially vertical axis inside of but closely adjacent a recess forming portion of the wall of said hull, one arm of each of said bell cranks being connected to an end of said tie rod and the other arm of each of said bell cranks extending through said wall portion, a steering knuckle arm on each of said steerable wheels, and a fore and aft drag link connecting pivotally between each steering knuckle arm and the outer end of each of said second mentioned bell crank arms.

13. In an amphibian vehicle, a watertight hull, spaced fore and aft differential driving axles, a power plant within said hull and having driving connection with both of said axles, clutch means for interrupting the driving connection between said power plant and one of said axles, a brake associated with each end of each said differential driving axle, and means for selectively maintaining an individual brake in locked position.

14. In an amphibian vehicle, a watertight hull, spaced fore and aft differential driving axles, a power plant within said hull and having driving connection with both of said axles, clutch means for interrupting the driving connection between said power plant and one of said axles, a brake associated with each end of each said differential driving axles, means for simultaneously energizing the brakes, and means associated with individual brakes for selectively locking the same in energized position to retain individual braking of preselected ends of said driving axles following a normal brake energizing operation.

15. In an amphibian vehicle, a watertight hull, spaced fore and aft differential driving axles, a power plant within said hull and having driving connection with both of said axles, clutch means for interrupting the driving connection between said power plant and one of said axles, a brake associated with each end of each said differential driving axle, a fluid reservoir, conduits between each of said brakes and said fluid reservoir, means for forcing fluid from said reservoir into said conduits to energize said brakes, and means for selectively shutting off any one of said conduits while the brakes are in energized position.

16. In an amphibian vehicle, a watertight hull, a differential driving axle extending transversely of said hull and having terminal drive portions extending through said hull, motive means in said hull for imparting driving rotation to said axle, an elongate drive transmission casing associated with one of said drive portions and having spaced sprockets in opposite ends thereof and a cooperating endless drive chain, one of said sprockets being fixed to one of the terminal drive portions of said driving axle and said casing being pivotally attached to a wall of said hull on an axis coincident with the axis of said driving axle, a land traction wheel supported by the opposite end of said casing and having driving connection with the other of said sprockets, and yieldable means providing resilient pivotal movement of said casings to cushion road shocks.

17. In an amphibian vehicle, a watertight hull, spaced fore and aft recesses at opposite sides of said hull to provide compartments for receiving land traction wheels, an elongate drive transmission casing in each compartment having therein spaced sprockets and cooperating endless drive chain, one of said sprockets being associated with drive means within said hull and the transmission casing being pivotally attached to said hull coaxially with said sprocket, a traction wheel supported by said transmission casing and having driving connection with the other of said sprockets, and a resilient strut engaging between the transmission casing adjacent said other sprocket and an upper stationary part of the vehicle, said strut being resiliently compressible for rendering each wheel independently resiliently mounted.

18. In an amphibian vehicle, a watertight hull, an external channel recess in the bottom thereof, drive means extending from within said hull into said recess and extending rearwardly, a propeller at the rear of said drive means, a supporting bracket carried by said drive means adjacent said propeller and a steering rudder carried by said bracket, said drive means having a flexible portion permitting raising and lowering of the rear thereof to raise and lower said propeller and said rudder bracket to inoperative and operative positions respectively, means for raising and lowering said propeller and bracket comprising fluid motor means in said hull and having an actuating part projecting laterally into said recess, and a bell crank disposed above said propeller in said recess, one arm of said bell crank being connected to said actuating part and the other arm being connected to said propeller assembly for lifting the same.

19. In an amphibian vehicle, a watertight hull, an external channel recess in the bottom thereof, drive means extending from within said hull into said recess and extending rearwardly, a propeller at the rear of said drive means, said drive means having a flexible portion permitting raising and lowering of the rear thereof to raise and lower said propeller to inoperative and operative positions respectively, means for raising and lowering said propeller comprising fluid motor means in said hull and having an actuating part projecting laterally into said recess, and a bell crank disposed above said propeller in said recess, one arm of said bell crank being connected to said actuating part and the other arm being connected to said propeller for lifting the same, said other arm being arranged to move over dead center in raising said propeller where the force of gravity acting on said propel retains it in raised position when said fluid mo means is inoperative.

20. In an amphibian vehicle, a watertight h a differential driving axle extending transvers of said hull and having terminal drive portic extending through said hull, a traction wh spaced longitudinally of said hull from said t minal drive portions, means supporting each tra tion wheel for pivotal movement about its as ciated differential axle, resilient means yielda permitting limited upward pivotal movement said traction wheel, self-locking manual mea for moving each of said supporting means abc its pivot independently of said resilient mea for selectively defining the primary vertical po tion of its associated traction wheel, and dri means between each differential axle termin and its associated wheel and movable with sa supporting means.

21. An amphibian vehicle comprising a wate tight hull, an inwardly directed recess at ea side thereof, a differential driving axle extendi transversely of said vehicle and terminating its opposite ends in said wheel compartmen a traction wheel in each of said compartmer rearwardly of said differential axle termin means supporting each traction wheel for pivot movement about its associated differential ax resilient means yieldably permitting limited u ward pivotal movement of said traction whe and self-locking manual means for moving ea of said supporting means about its pivot ind pendently of said resilient means for selective defining the primary vertical position of its a sociated traction wheel.

ROGER W. HOFHEINS.
CARLOS E. HARRINGTON.
CHARLES D. THOMAS.
PAUL P. M. DUBOSCLARD.

Patent No. 2,350,037.  May 30, 1944.

ROGER W. HOFHEINS, ET AL.

It is hereby certified that error appears in the printed specification of the above numbered patent requiring correction as follows: Page 7, second column, line 52, for "one" read --each--; and that the said Letters Patent should be read with this correction therein that the same may conform to the record of the case in the Patent Office.

Signed and sealed this 25th day of July, A. D. 1944.

Leslie Frazer

(Seal)  Acting Commissioner of Patents.